(12) United States Patent
Boggio et al.

(10) Patent No.: US 10,916,071 B2
(45) Date of Patent: Feb. 9, 2021

(54) MAINTENANCE INDUCTION FOR AIRCRAFT

(71) Applicant: The Boeing Company, Chicago, IL (US)

(72) Inventors: John Matthew Boggio, Berkeley, MO (US); Alexander Stephen Burch, Berkeley, MO (US)

(73) Assignee: The Boeing Company, Chicago, IL (US)

( * ) Notice: Subject to any disclaimer, the term of this patent is extended or adjusted under 35 U.S.C. 154(b) by 168 days.

(21) Appl. No.: 16/119,094

(22) Filed: Aug. 31, 2018

(65) Prior Publication Data

US 2020/0074758 A1 Mar. 5, 2020

(51) Int. Cl.
| | |
|---|---|
| *G07C 5/00* | (2006.01) |
| *G06F 17/18* | (2006.01) |
| *G06F 17/16* | (2006.01) |
| *B64F 5/60* | (2017.01) |
| *G07C 5/08* | (2006.01) |

(Continued)

(52) U.S. Cl.
CPC .............. *G07C 5/006* (2013.01); *B64F 5/60* (2017.01); *G06F 17/16* (2013.01); *G06F 17/18* (2013.01); *G06F 30/20* (2020.01); *G07C 5/0808* (2013.01); *G07C 5/0841* (2013.01); *G06F 2111/10* (2020.01)

(58) Field of Classification Search
CPC .... G07C 5/006; G07C 5/0808; G07C 5/0841; G07C 5/0825; G06F 30/20; G06F 17/18; G06F 17/16; G06F 2111/10; B64F 5/60
See application file for complete search history.

(56) References Cited

U.S. PATENT DOCUMENTS

| 8,725,456 B1 * | 5/2014 | Saha ................... G05B 23/0283 |
| | | 702/181 |
| 2015/0274315 A1 * | 10/2015 | Conrad .................. B64D 45/00 |
| | | 701/31.9 |
| 2017/0017736 A1 * | 1/2017 | Beale ...................... G06F 30/20 |

(Continued)

OTHER PUBLICATIONS

Relevant Publications: Lindauer, Jason. (2010) "F/A-18(A-d) Wing Root Fatigue Life Expended (FLE) Prediction Without the Use of Strain Gauge Data." Naval Postgraduate School Thesis Larson, C.

(Continued)

*Primary Examiner* — Jess Whittington
*Assistant Examiner* — Brian E Yang
(74) *Attorney, Agent, or Firm* — Womble Bond Dickinson (US) LLP

(57) ABSTRACT

An apparatus for predicting structural degradation and performing maintenance induction for a plurality of in-service aircraft is provided. The apparatus identifies maintenance requirements for the plurality of in-service aircraft and receives fatigue metric values on historical usage and structural health condition of the plurality of in-service aircraft. The apparatus predicts levels of structural degradation to the plurality of in-service aircraft based on the fatigue metric values and assigns maintenance priorities to the plurality of in-service aircraft based on the levels of structural degradation. The apparatus generates an instruction to route an aircraft of the plurality of in-service aircraft to a maintenance facility for maintenance based on a maintenance priority of the maintenance priorities assigned to the aircraft.

15 Claims, 10 Drawing Sheets

(51) Int. Cl.
    *G06F 30/20*     (2020.01)
    *G06F 111/10*     (2020.01)

(56) References Cited

U.S. PATENT DOCUMENTS

| | | | | |
|---|---|---|---|---|
| 2017/0183107 | A1* | 6/2017 | Brookhart | G06Q 10/08 |
| 2017/0236075 | A1* | 8/2017 | Shi | G06T 7/001 |
| | | | | 701/31.4 |
| 2017/0293712 | A1* | 10/2017 | Dekker | G06F 30/20 |
| 2018/0082266 | A1* | 3/2018 | Safaei | G06Q 10/20 |
| 2018/0189750 | A1* | 7/2018 | Nonaka | G06T 7/0004 |
| 2018/0346151 | A1* | 12/2018 | Sturlaugson | G06N 20/20 |

OTHER PUBLICATIONS

Shawver, R. (1983) Method for Determining Probability of Structural Failure from Aircraft Counting Accelerometer Tracking Data. American Society for Testing and Materials, p. 147-148.

* cited by examiner

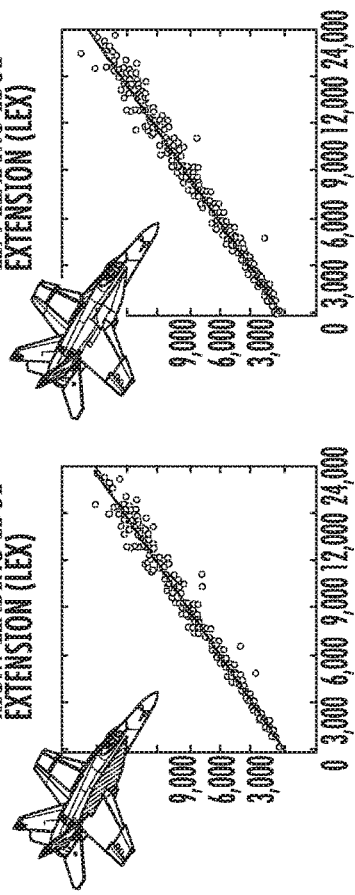
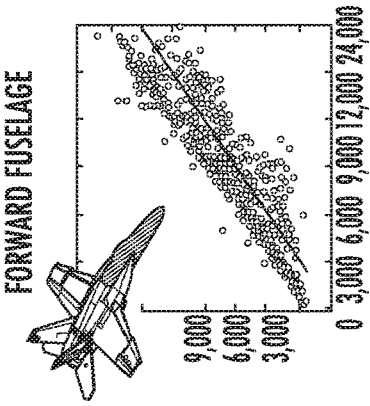
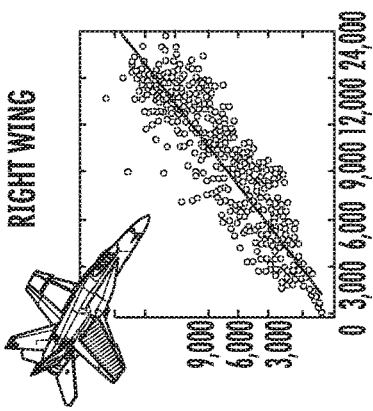
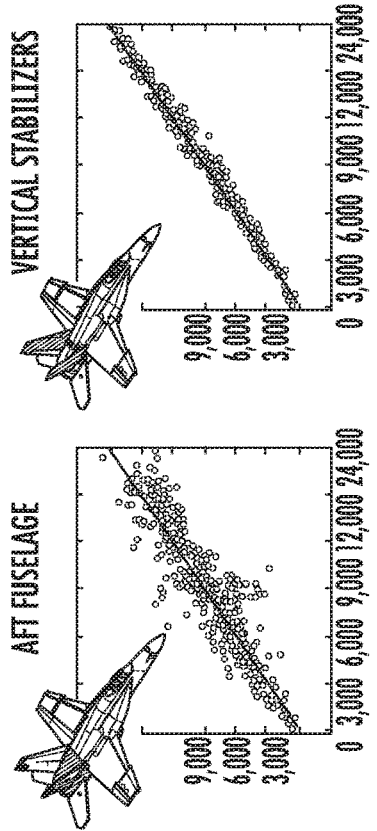
FIG. 6A  FIG. 6B  FIG. 6C  FIG. 6D
FIG. 6E  FIG. 6F  FIG. 6G  FIG. 6H

*VALUES IN CHART ARE NOT REAL, THEY ARE FOR ILLUSTRATIVE PURPOSES ONLY

MAINTENANCE INDUCTION FOR AIRCRAFT

TECHNOLOGICAL FIELD

The present disclosure relates generally to performing maintenance induction for aircraft, and in particular, to predicting structural degradation and performing maintenance induction for aircraft based on the predicted structural degradation.

BACKGROUND

Maintenance induction is a process of selecting an aircraft in need of maintenance and routing the selected aircraft to the proper maintenance facility.

Maintenance induction for aircraft is regularly performed to induct aircraft for repair, update, or replacement of aircraft parts to keep the aircraft in a condition for in-service operation.

BRIEF SUMMARY

Example implementations of the present disclosure are directed to predicting structural degradation and performing maintenance induction for aircraft based on the predicted structural degradation. Example implementations provide a data-driven solution that forecasts the overall structural degradation based on aircraft usage data and fatigue measurements relative to the rest of the fleet. Thus, example implementations can provide a more precise insight into the health of each individual aircraft compared to current solutions. Also, example implementations can estimate fatigue on individual sections of the aircraft which enables optimal maintenance facility dispatching, part delivery, and personnel assignment. Knowing which sections of the aircraft are likely to require the most work will help ensure that the requisite parts and personnel are on hand when the aircraft arrives at the facility. Moreover, example implementations can dispatch or route the aircraft to the optimal maintenance facility based on the maintenance requirements of the aircraft and the facility's capabilities.

The present disclosure thus includes, without limitation, the following example implementations.

Some example implementations provide a method of predicting structural degradation and performing maintenance induction for a plurality of in-service aircraft, comprising: identifying maintenance requirements for the plurality of in-service aircraft; receiving fatigue metric values on historical usage and structural health condition of the plurality of in-service aircraft, the fatigue metric values being measured by or determined from measurements from onboard sensors coupled to common load bearing joint areas of the plurality of in-service aircraft; predicting levels of structural degradation to the plurality of in-service aircraft based on the fatigue metric values; assigning maintenance priorities to the plurality of in-service aircraft based on the levels of structural degradation; and generating an instruction to route an aircraft of the plurality of in-service aircraft to a maintenance facility for maintenance based on a maintenance priority of the maintenance priorities assigned to the aircraft, the maintenance facility being capable of performing maintenance on the aircraft routed thereto consistent with the maintenance requirements for the aircraft.

In some example implementations of the method of any preceding example implementation, or any combination of preceding example implementations, predicting the levels of structural degradation includes predicting the levels of structural degradation to each of the plurality of in-service aircraft.

In some example implementations of the method of any preceding example implementation, or any combination of preceding example implementations, the fatigue metric values are values of a fatigue metric, and predicting the levels of structural degradation to each of the plurality of in-service aircraft includes for each aircraft of the plurality of in-service aircraft: accessing a regression model of a relationship between the fatigue metric and a usage metric of the aircraft; and applying a fatigue metric value of the aircraft to the regression model to predict and thereby produce a predicted usage metric value of the aircraft that corresponds to the level of structural degradation to the aircraft.

In some example implementations of the method of any preceding example implementation, or any combination of preceding example implementations, predicting the levels of structural degradation to each of the plurality of in-service aircraft includes for each aircraft of the plurality of in-service aircraft: determining a magnitude of deviation between a fatigue metric value of the aircraft and an average of the fatigue metric values of the plurality of in-service aircraft; and determining a score of structural degradation for the aircraft based on the magnitude of deviation that corresponds to the level of structural degradation to the aircraft.

In some example implementations of the method of any preceding example implementation, or any combination of preceding example implementations, receiving fatigue metric values includes receiving fatigue metric values on historical usage and structural health condition of the common load bearing joint areas of the plurality of in-service aircraft, and predicting the levels of structural degradation includes predicting the levels of structural degradation to the common load bearing joint areas of each of the plurality of in-service aircraft.

In some example implementations of the method of any preceding example implementation, or any combination of preceding example implementations, the fatigue metric values are values of a fatigue metric, and predicting the levels of structural degradation to the common load bearing joint areas includes for each common load bearing joint area of an aircraft of the plurality of in-service aircraft: accessing a regression model of a relationship between the fatigue metric and a usage metric of the common load bearing joint area; and applying a fatigue metric value of the common load bearing joint area to the regression model to predict and thereby produce a predicted usage metric value of the common load bearing joint area that corresponds to the level of structural degradation to the common load bearing joint area of the aircraft.

In some example implementations of the method of any preceding example implementation, or any combination of preceding example implementations, predicting the levels of structural degradation to the common load bearing joint areas includes for each common load bearing joint area of an aircraft of the plurality of in-service aircraft: determining a magnitude of deviation between a fatigue metric value of the common load bearing joint area of the aircraft and an average of the fatigue metric values of the common load bearing joint area of the plurality of in-service aircraft; and determining a score of structural degradation for the common load bearing joint area of the aircraft based on the magnitude of deviation that corresponds to the level of structural degradation to the common load bearing joint area of the aircraft.

Some example implementations provide an apparatus for predicting structural degradation and performing maintenance induction for a plurality of in-service aircraft. The apparatus comprises a processor and a memory storing executable instructions that, in response to execution by the processor, cause the apparatus to at least perform the method of any preceding example implementation, or any combination of any preceding example implementations.

Some example implementations provide a computer-readable storage medium for predicting structural degradation and performing maintenance induction for a plurality of in-service aircraft. The computer-readable storage medium is non-transitory and has computer-readable program code stored therein that in response to execution by a processor, causes an apparatus to at least perform the method of any preceding example implementation, or any combination thereof.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

Figure 7A:
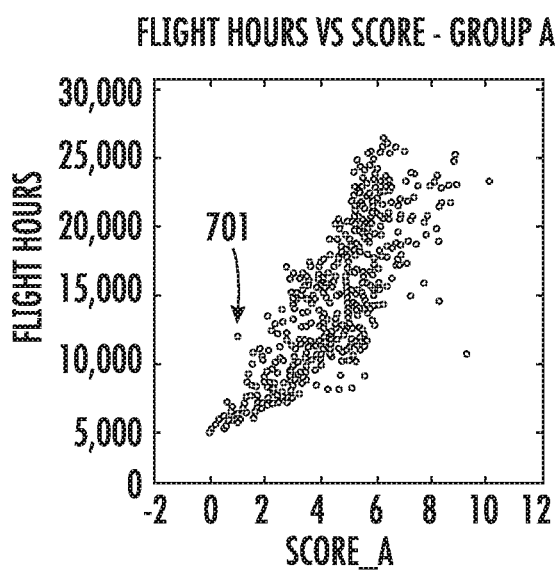
Figure 7B:
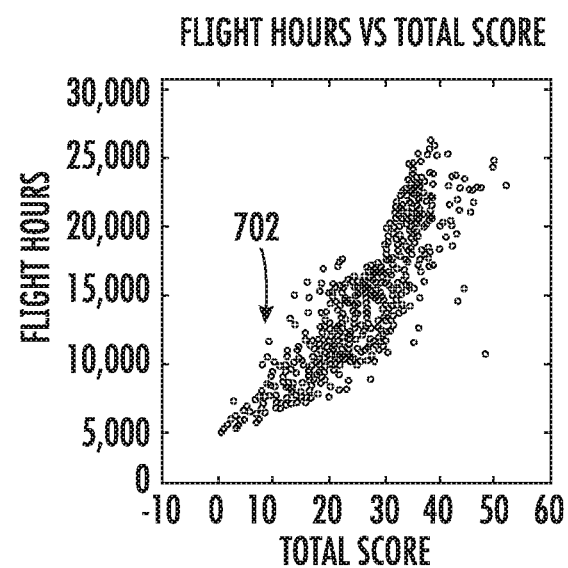
Figure 8:
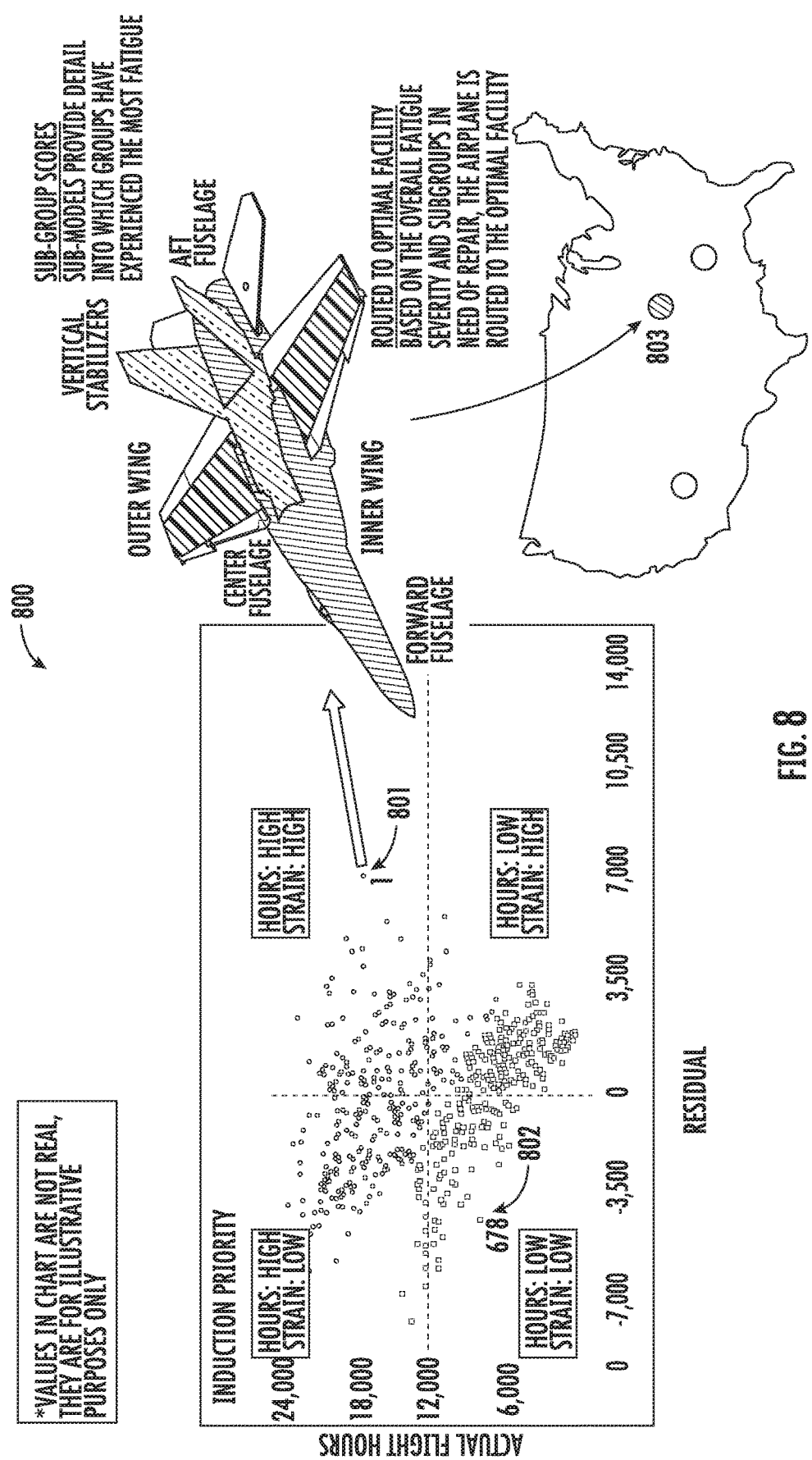
Figure 9:
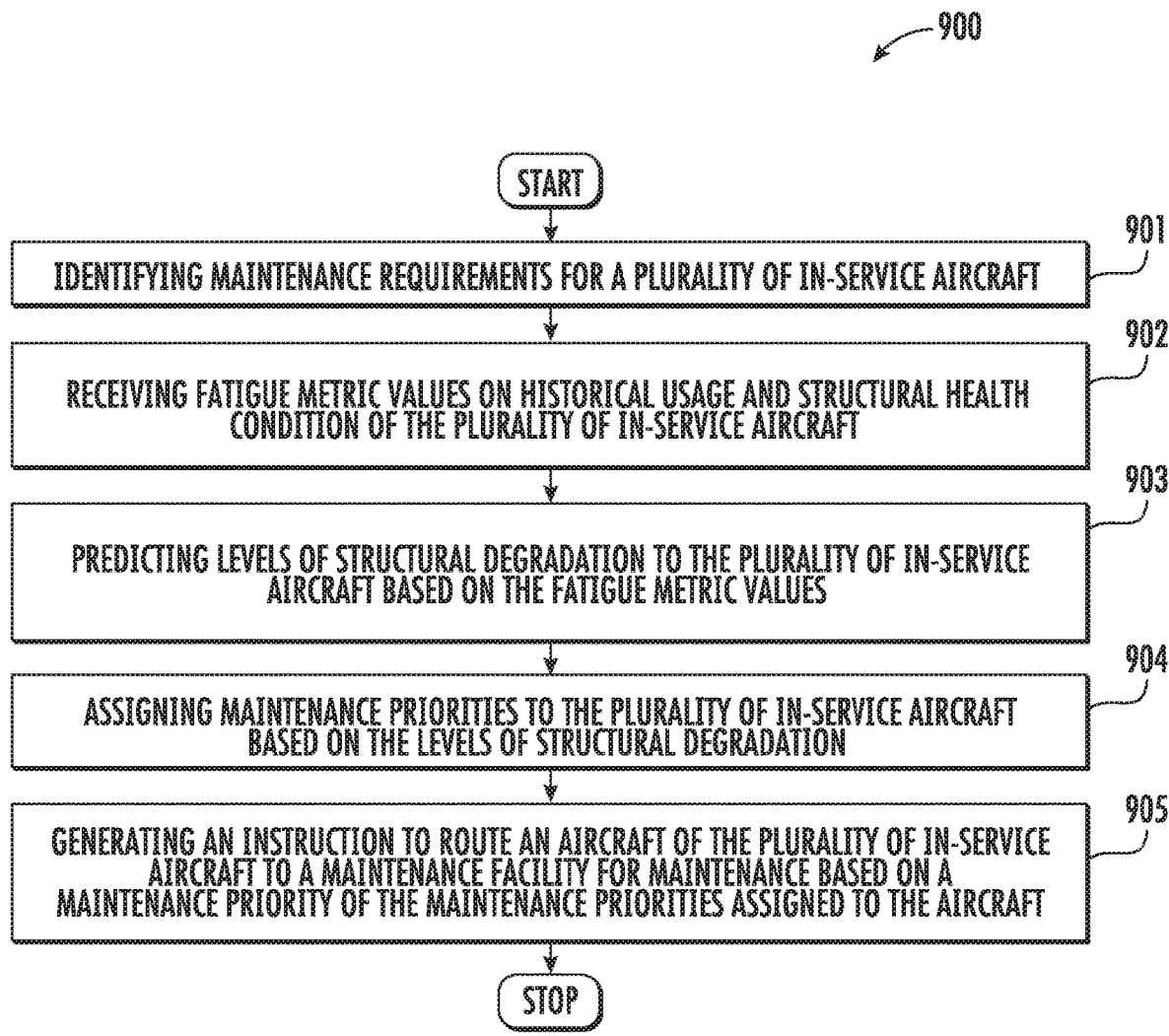
Figure 10:
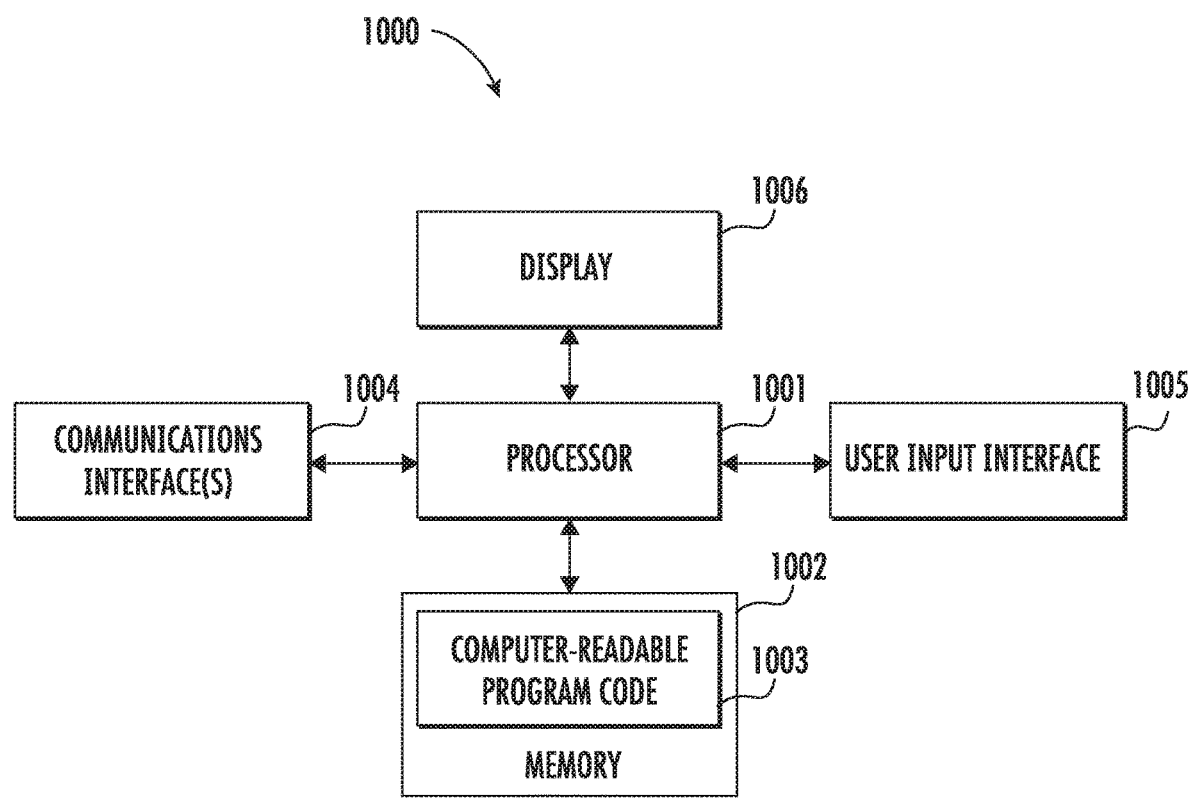

FIGS. 6(A)-6(H) illustrate predicted flight hours of common load bearing joint areas of a plurality of in-service aircraft, according to various example implementations;

FIGS. 7(A) and 7(B) illustrate scores of structural degradation for a plurality of in-service aircraft, according to various example implementations;

FIG. 8 illustrates routing an aircraft to a maintenance facility based on predicted structural degradation, according to various example implementations;

FIG. 9 is a flowchart illustrating various operations in a method of predicting structural degradation and performing maintenance induction for a plurality of in-service aircraft, according to various example implementations; and FIG. 10 illustrates an apparatus according to some example implementations;

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure are generally directed to maintenance induction of aircraft, and in particular, to predicting structural degradation and performing maintenance induction for the aircraft based on the predicted structural degradation. The system is primarily described in the context of an aircraft, but it should be understood that the system is equally applicable to any of a number of types of vehicles such as any of a number of different types of manned or unmanned land vehicles, aircraft, spacecraft, watercraft or the like.

One solution of performing maintenance induction is that aircraft are inducted for maintenance largely based on their usage, e.g., actual flight hours. This solution is not optimal because of different ways in which aircraft are flown. For example, aircraft with lower flight hours that have been flown in high-stress situations or harsh environment may be more fatigued than aircraft with higher flight hours that have been flown less harshly. Also, it is difficult for this solution to determine which sections or areas of the aircraft are degraded, as well as the overall fatigue of the aircraft. Because different maintenance facilities have different capabilities, it may be desired to send the most fatigued aircraft to the maintenance facility with the highest level of capability. Otherwise, the in-service availability of the aircraft may be reduced and the cost of maintenance of the aircraft may be increased.

Figure 1:
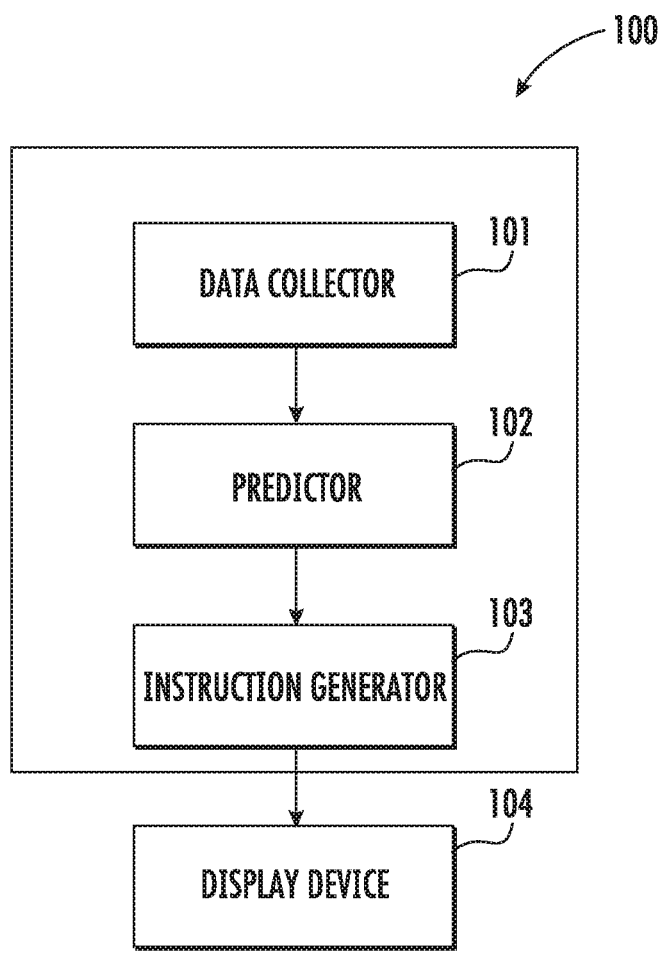
FIG. 1 illustrates a system for predicting structural degradation and performing maintenance induction for a plurality of in-service aircraft, according to example implementations of the present disclosure.

FIG. 1 illustrates a system 100 for predicting structural degradation and performing maintenance induction for a plurality of in-service aircraft, according to example implementations of the present disclosure. In some examples, as described in greater detail with reference to FIG. 10, the system may be implemented by an apparatus for predicting structural degradation and performing maintenance induction for a plurality of in-service aircraft.

The system 100 includes any of a number of different subsystems (each an individual system) for performing one or more functions or operations. As shown, in some examples, the system includes one or more of each of a data collector 101, a predictor 102, an instruction generator 103 and a display device 104. The subsystems may be co-located or directly coupled to one another, or in some examples, various ones of the subsystems may communicate with one another across one or more computer networks. Further, although shown as part of the system, it should be understood that any one or more of the data collector, predictor, instruction generator and display device may function or operate as a separate system without regard to any of the other subsystems. It should also be understood that the system may include one or more additional or alternative subsystems than those shown in FIG. 1.

In some examples, the data collector 101 is configured to identify maintenance requirements for a plurality of in-service aircraft, and receive fatigue metric values on historical usage and structural health condition of the plurality of in-service aircraft. In some examples, either or both the maintenance requirements or fatigue metric values may be stored in and extracted by the data collector from a database.

The maintenance requirements may include requisite aircraft parts, personnel and equipment at maintenance facilities for performing different maintenance tasks for the plurality of in-service aircraft. The fatigue metric values are measured by or determined from measurements from onboard sensors coupled to common load bearing joint areas of the plurality of in-service aircraft, as described in details in FIGS. 2 and 3 below. The historical usage may include historical actual flight hours of the plurality of in-service aircraft or common load bearing joints areas thereof. The structural health condition may include strain of the plurality of in-service aircraft or common load bearing joints areas thereof.

The predictor 102 is configured to predict levels of structural degradation to the plurality of in-service aircraft based on the measured fatigue metric values. In this regard, the predictor 102 can predict an overall level of structural degradation to an entire aircraft. In some examples, then, the predictor is configured to predict the levels of structural degradation to each of the plurality of in-service aircraft based on the fatigue metric values. In these examples, the fatigue metric values are values of a fatigue metric representing historical usage and structural health condition of each of the plurality of in-service aircraft. In one example, the fatigue metric is strain on the plurality of aircraft.

In some examples, for each aircraft of the plurality of in-service aircraft, the predictor is configured to access a regression model of a relationship between the fatigue metric and a usage metric of the aircraft. The predictor is also configured to apply a fatigue metric value of the aircraft to the regression model to predict and thereby produce a predicted usage metric value of the aircraft. The predicted usage metric corresponds to the level of structural degradation to the aircraft.

The regression model may be a linear or non-linear regression model. In the relationship described by the regression model, the fatigue metric may be an independent variable, and the usage metric may be a dependent variable. In one example, different or separate regression models may be used for different aircraft to predict and thereby produce the predicted usage metric values for different aircraft. In one example, the usage metric is flight hours of the aircraft, and the predicted usage metric value is a predicted number of flight hours of the aircraft (e.g., 2000 flight hours). In other examples, the usage metric may include number of takeoff or landings, number of catapults for carrier based aircraft, or number of maintenance operations or events that have been performed on an aircraft at the whole aircraft level or at the specific group levels of an aircraft. In further examples, the usage metric may include time spent grounded from active duty, ship arrests, or flight hours for certain mission types. The usage metric may also include combinations of the above metrics. Examples of usage metric values of the aircraft will be described in further detail below with reference to FIGS. 4 and 5.

In other examples the predictor 102 is configured to produce a predicted usage metric value of the aircraft in other manners. In some examples, for each aircraft of the plurality of in-service aircraft, the predictor is configured to determine a magnitude of deviation between a fatigue metric value of the aircraft and an average of the fatigue metric values of the plurality of in-service aircraft. The predictor is also configured to determine a score of structural degradation for the aircraft based on the magnitude of deviation. The score corresponds to the level of structural degradation to the aircraft. Determining the magnitude of deviation and the score of structural degradation for the aircraft will be described in further detail below with reference to FIG. 7.

The predictor 102 can also predict a level of structural degradation to a specific common load bearing joint area or a section of an aircraft. In this regard, in some examples, the predictor is configured to predict the levels of structural degradation to the common load bearing joint areas of each of the plurality of in-service aircraft. In these examples, the fatigue metric values are values of a fatigue metric representing historical usage and structural health condition of the common load bearing joint areas of each of the plurality of in-service aircraft.

In some examples, for each common load bearing joint area of an aircraft of the plurality of in-service aircraft, the predictor 102 is configured to access a regression model of a relationship between the fatigue metric and a usage metric of the common load bearing joint area. The predictor is also configured to apply a fatigue metric value of the common load bearing joint area to the regression model to predict and thereby produce a predicted usage metric value of the common load bearing joint area. The predicted usage metric value corresponds to the level of structural degradation to the common load bearing joint area of the aircraft. Similarly as above, the regression model may be a linear or non-linear regression model. In the relationship described by the regression model, the fatigue metric may be an independent variable, and the usage metric may be a dependent variable. In one example, different or separate regression models may be used for different common load bearing joint areas to predict and thereby produce the predicted usage metric values for different common load bearing joint areas. In one example, the usage metric is flight hours of the common load bearing joint areas, and the predicted usage metric value is a predicted number of flight hours of the common load bearing joint areas (e.g., 2000 flight hours). Examples of usage metric values of the common load bearing joint areas will be described in further detail below with reference to FIG. 6.

In other examples the predictor 102 is configured to produce a predicted usage metric value of the common load bearing joint areas in other manners. In some examples, for each common load bearing joint area of an aircraft of the plurality of in-service aircraft, the predictor is configured to determine a magnitude of deviation between a fatigue metric value of the common load bearing joint area of the aircraft and an average of the fatigue metric values of the common load bearing joint area of the plurality of in-service aircraft. The predictor is also configured to determine a score of predicted structural degradation for the common load bearing joint area of the aircraft based on the magnitude of deviation. The score corresponds to the level of structural degradation to the common load bearing joint area of the aircraft.

In some examples, the predictor 102 is further configured to assign maintenance priorities to the plurality of in-service aircraft based on the predicted levels of structural degradation. In one example, the aircraft with the highest level of structural degradation is assigned the highest maintenance priority among the plurality of in-service aircraft.

The instruction generator 103 is then configured to generate an instruction to route an aircraft of the plurality of in-service aircraft to a maintenance facility for maintenance based on a maintenance priority of the maintenance priorities assigned to the aircraft. The maintenance facility is capable of performing maintenance on the aircraft routed thereto consistent with the maintenance requirements for the aircraft. This may include the maintenance facility having the requisite aircraft parts, personnel and equipment to perform a maintenance task for the aircraft routed to the maintenance facility. After the aircraft is routed to the maintenance facility, the maintenance facility can perform the maintenance task such as for repair, update, or replacement of aircraft parts for the aircraft.

In one example, the instruction generator 103 is configured to provide the instruction to the display device 104 to display it to a user. The display device can also display the predicted usage metric value and/or the score of structural degradation to the user.

Figure 2:
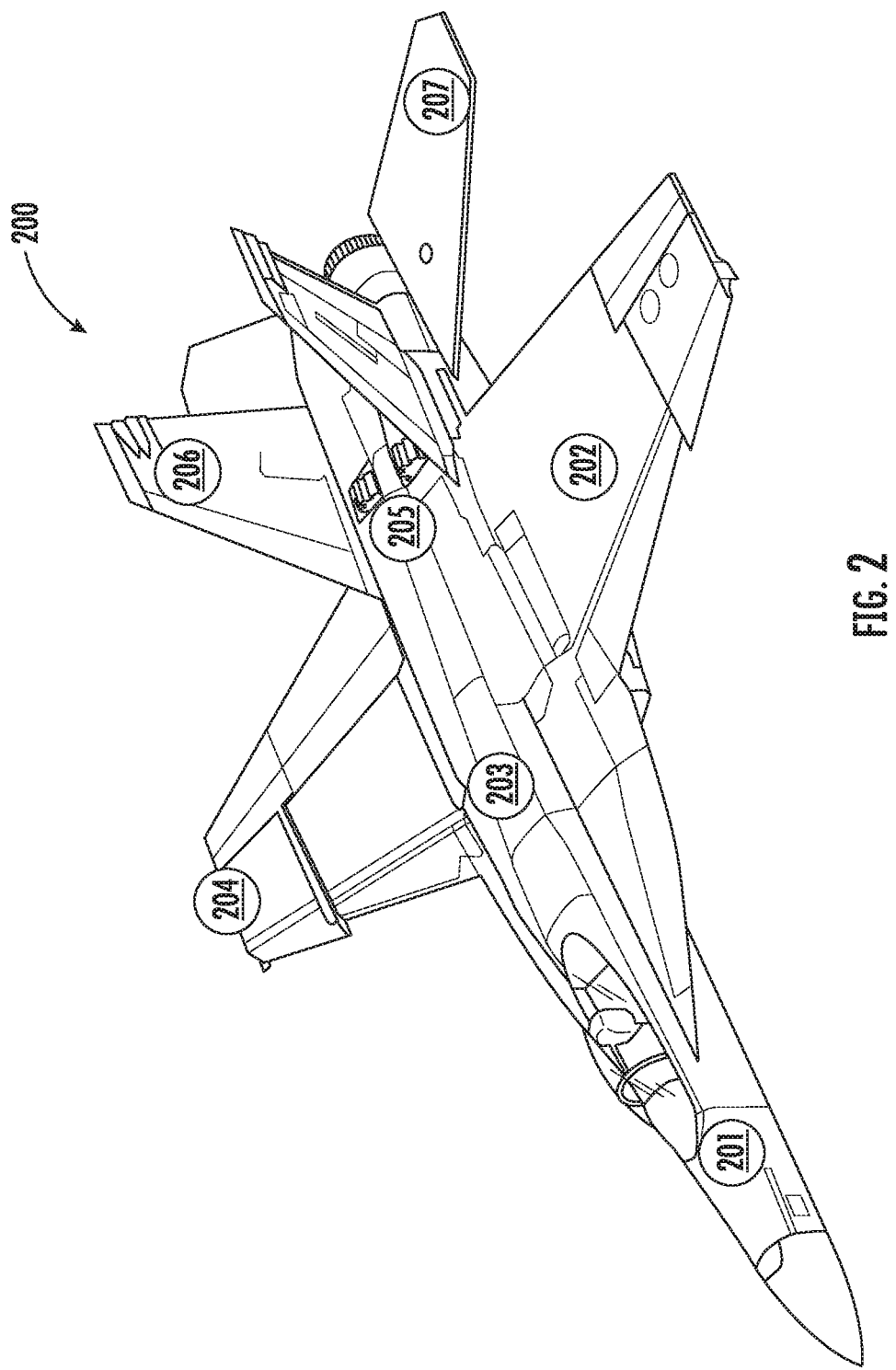
FIG. 2 illustrates onboard sensors on an aircraft to measure fatigue of the aircraft, according to various example implementations.

FIG. 2 illustrates onboard sensors on an aircraft to measure fatigue of the aircraft, according to various example implementations. As shown, the aircraft 200 has a plurality of onboard sensors 201-207 from which to measure fatigue of the aircraft. As explained above, the measured fatigue may include fatigue metric values on historical usage and structural health condition of the aircraft. In one example, the sensors are positioned or installed at some common load bearing joints areas of the aircraft. For example, the sensor 202 is positioned at the left wing of the aircraft, and the sensor 201 is positioned at the forward fuselage of the aircraft. In one example, the sensors include strain gauges used to directly measure strain on the aircraft throughout the airframe. The measured strain can be represented by percentage. For example, 10% may indicate a low strain and 90% may indicate a high strain. Measured strain values, then, can be the fatigue metric values applied to the regression model(s).

Figure 3:
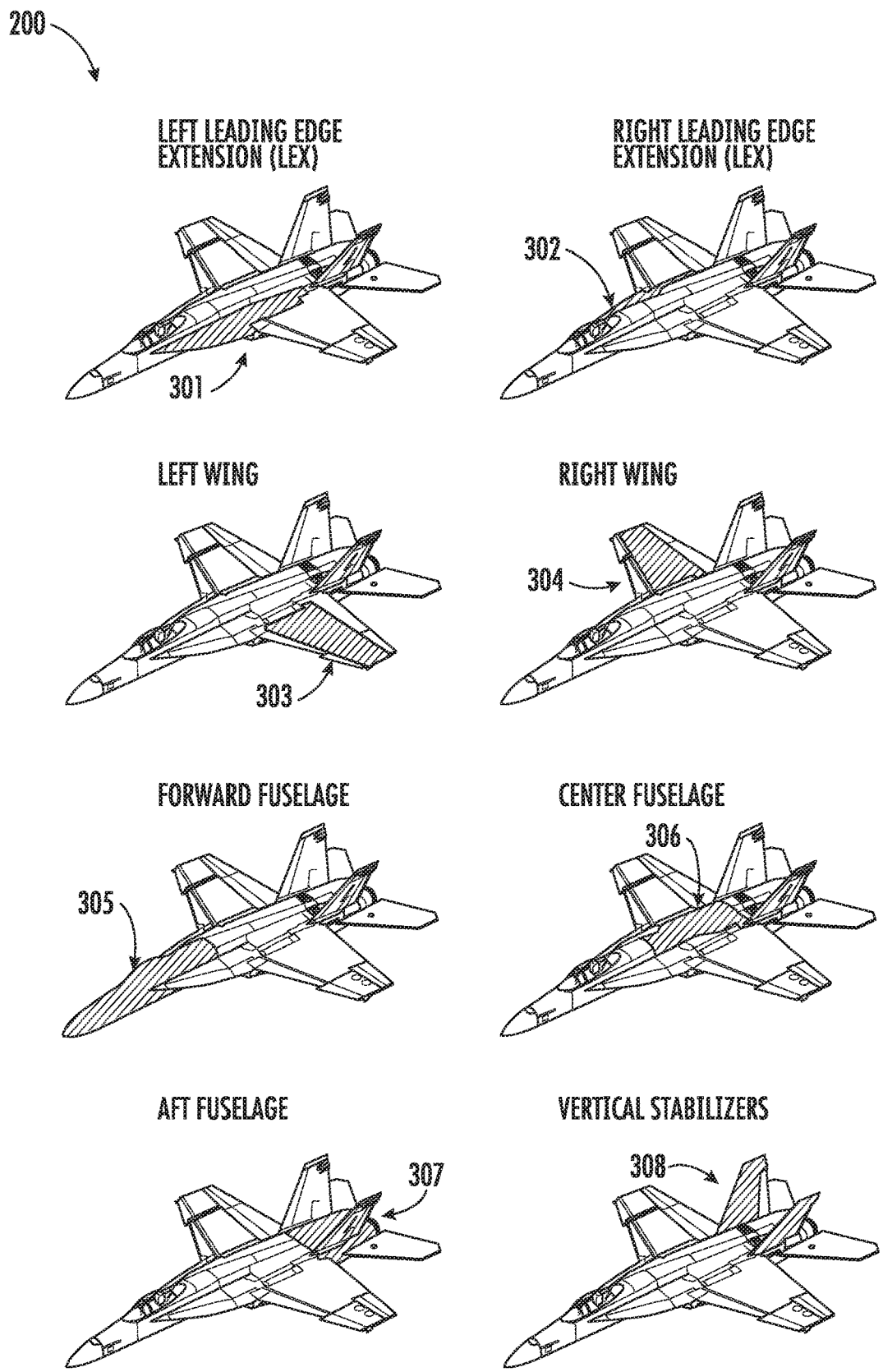
FIG. 3 illustrates common load bearing joint areas of an aircraft for fatigue measurement, according to one example implementation.

FIG. 3 illustrates common load bearing joint areas of an aircraft for fatigue measurement, according to one example implementation. As shown, the aircraft 200 has a plurality of common load bearing joint areas including the left leading edge extension 301, the right leading edge extension 302, the left wing 303, the right wing 304, the forward fuselage 305, the center fuselage 306, the aft fuselage 307 and the vertical stabilizers 308. In one example, each of the common load bearing joint areas has a sensor positioned there to measure fatigue metric values of the corresponding common load bearing joint area, such as strain on the common load bearing joint area. Thus, the data collector 101 may be able to receive measured fatigue metric values for each of the common load bearing joint areas of the aircraft, which can be used to predict the level of structural degradation separately to each of the common load bearing joint areas.

Figure 4:
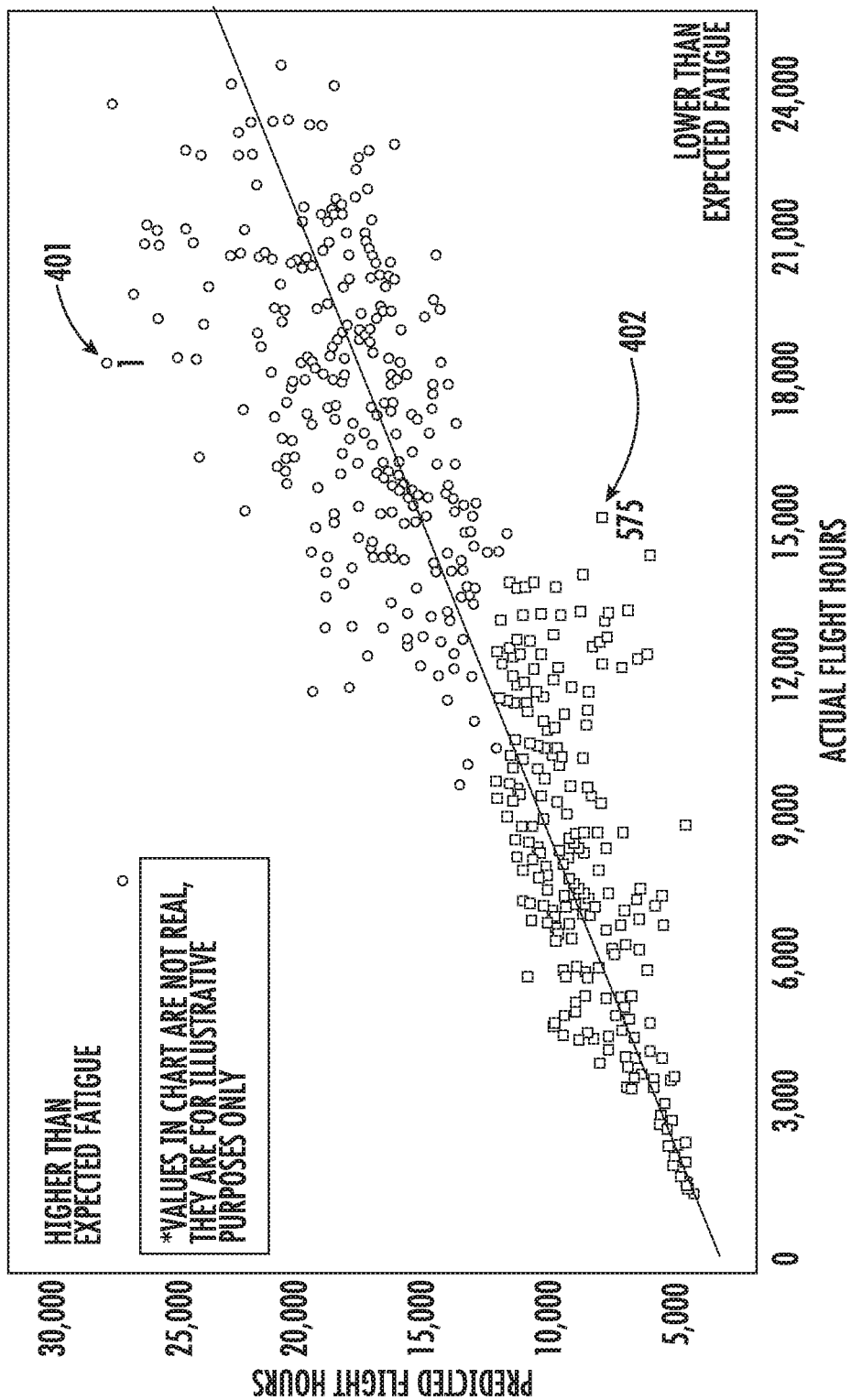
FIG. 4 illustrates predicted flight hours of a plurality of in-service aircraft, according to one example implementation.

FIG. 4 illustrates predicted flight hours of a plurality of in-service aircraft, according to one example implementation. As shown, each circle in FIG. 4 represents an aircraft of the plurality of in-service aircraft. For example, circle 401 indicates an aircraft that has actual flight hours of 18,000 hours (i.e., the value on the X-axis) and a predicted flight hours of 28,000 hours (i.e., the value on the Y-axis). In this example, the aircraft indicated by circle 401 has predicted flight hours higher than its actual fight hours, which indicates that this aircraft has more structural degradation than an average aircraft with approximately 18,000 actual flight hours. In other words, an average aircraft with actual flight hours of approximately 28,000 hours has the same fatigue as the aircraft indicated by circle 401. In one example, when an aircraft's predicted flight hours is higher than its actual fight hours, it indicates that the aircraft has a higher than expected fatigue.

In another example, circle 402 indicates an aircraft that has actual flight hours of 15,000 hours and predicted flight hours of 7,500 hours. In this example, the aircraft indicated by circle 402 has a predicted flight hours less than its actual fight hours, which indicates that this aircraft has less structural degradation than an average aircraft with approximately 15,000 actual flight hours. In one example, when an aircraft's predicted flight hours are lower than its actual fight hours, it indicates that the aircraft has a lower than expected fatigue. The predicted flight hours of an aircraft can be derived by applying measured fatigue metric values to a regression model as explained above.

In one example, the predictor 102 can rank the plurality of in-service aircraft based on each aircraft's predicted flight hours. The ranking can indicate the levels of structural degradation to the plurality of in-service aircraft and can therefore determine the maintenance priorities to the plurality of in-service aircraft. For example, the aircraft indicated by circle 401 is ranked first among the plurality of in-service aircraft because it has the highest predicted flight hours of 28,000 hours, which indicates that it has the most fatigue and the highest maintenance priority. In another example, the aircraft indicated by circle 402 is ranked 575th because it has less predicted flight hours and therefore lower maintenance priority.

Figure 5:
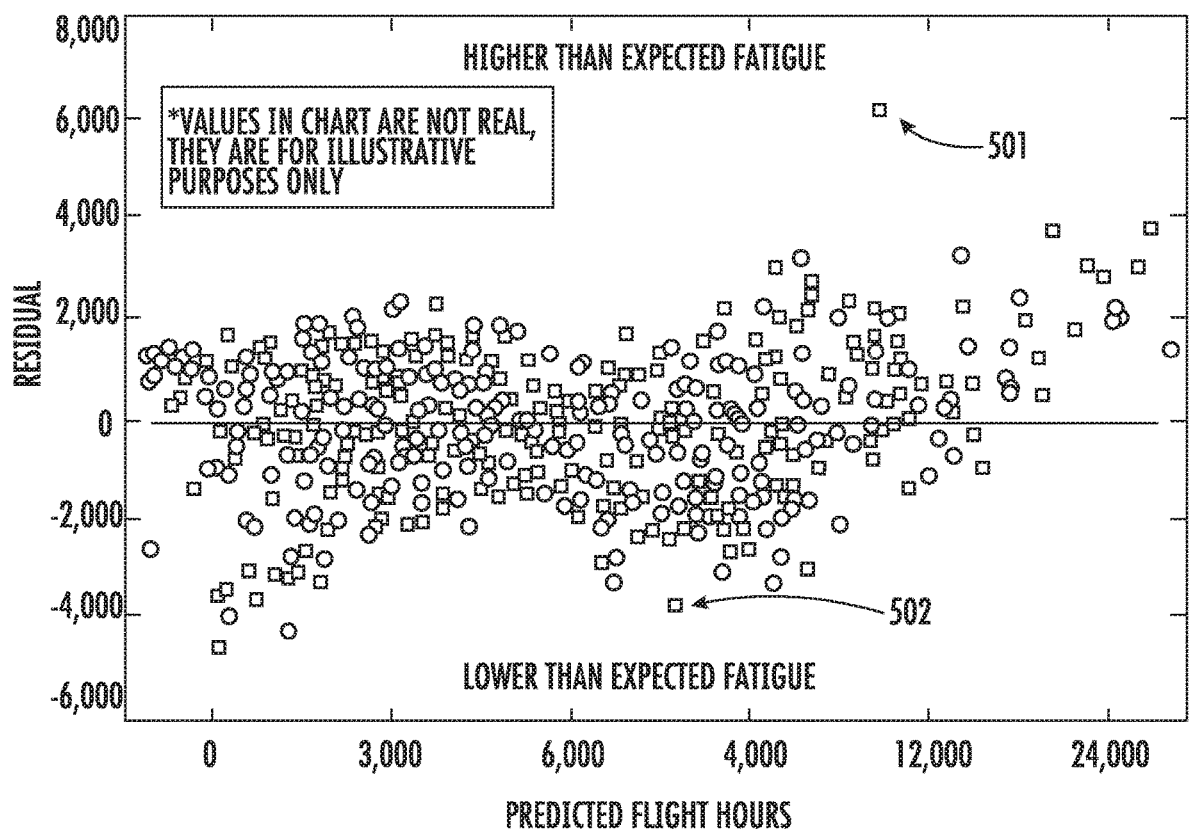
FIG. 5 illustrates predicted flight hours of a plurality of in-service aircraft, according to another example implementation.

FIG. 5 illustrates predicted flight hours of a plurality of in-service aircraft, according to another example implementation. As shown, each circle in FIG. 5 represents an aircraft of the plurality of in-service aircraft, similarly as in FIG. 4. The X-axis indicates the predicted flight hours of the aircraft. The Y-axis indicates the residual which represents the difference or deviation between predicted flight hours and actual flight hours, e.g., predict flight hours–actual flight hours. For example, circle 501 indicates an aircraft that has 11,000 predicted flight hours and 6,000 residual flight hours, which indicates that this aircraft's predicted flight hours are 6,000 hours higher than its actual flight hours, i.e., the actual flight hours is 5,000 hours. In another example, circle 502 indicates an aircraft that has 8,000 predicted flight hours and −4,000 residual flight hours, which indicates that this aircraft's predicted flight hours are 4,000 hours less than its actual flight hours, i.e., the actual flight hours are 4,000 hours.

FIGS. 6(A)-6(H) illustrate predicted flight hours of common load bearing joint areas of a plurality of in-service aircraft, or more specifically predicted flight hours for a plurality of common load bearing joint areas of each of the plurality of in-service aircraft, according to various example implementations. For example, FIG. 6(A) illustrates predicted flight hours for right leading edge extension of the plurality of in-service aircraft. Similarly, FIGS. 6(B)-6(H) illustrate predicted flight hours for different common load bearing joint areas of each of the plurality of in-service aircraft. As explained above, the predicted flight hours for a common load bearing joint area can be derived by applying measured fatigue metric values of the common load bearing joint area to a regression model. Thus, the predictor 102 can predict level of structural degradation for a specific common load bearing joint area of an aircraft.

FIGS. 7(A) and 7(B) illustrate scores of structural degradation for a plurality of in-service aircraft, according to various example implementations. FIG. 7(A) illustrates the scores of a structural group A for the plurality of in-service aircraft. The structural group A may indicate a specific common load bearing joint area, e.g., the left leading edge extension. Each dot in FIG. 7(A) indicates an aircraft. For example, dot 701 indicates an aircraft that has 11,000 actual flight hours (i.e., the value on the Y-axis) and a score of 1 (i.e., the value on the X-axis) for the left leading edge extension indicating the structural degradation of the left leading edge extension.

In one example, the score of structural degradation can be calculated based on a magnitude of deviation between a fatigue metric value of the common load bearing joint area of the aircraft, and an average of the fatigue metric values of the common load bearing joint area of the plurality of in-service aircraft. For each structural group, a vector of an average of the fatigue metric values for all samples can be calculated as:

$$\overline{x}_i = \langle \overline{x}_{1i}, \overline{x}_{2i}, \overline{x}_{3i}, \ldots \overline{x}_{ni} \rangle$$

where i is the group number, $\overline{x}_{ki}$ (k=1, 2, ... n) is the average value of the k-th fatigue measurement in group i, and $\overline{x}_i$ is the vector of average fatigue metric values of group i for all samples. In each structural group such as group A, each of the plurality of aircraft may have a total of n fatigue measurements, and $\overline{x}_{ki}$ (k=1, 2, . . . n) can be the average value of the k-th fatigue measurement over the plurality of aircraft. Each sample may be an aircraft of the plurality of aircraft.

For each sample, a magnitude of deviation between $S_{ij}$ and $\overline{x}_i$ can be calculated as:

$$\delta_{ij} = \|S_{ij}\| - \|\overline{x}_i\|$$

where $\|a\|$ is the Euclidean norm of a which can be referred to as magnitude, and $\delta_{ij}$ is the magnitude of $S_{ij}$ minus the magnitude of $\overline{x}_i$.

In one example, the predictor 102 can assign a score (e.g., from 0 to 10) to a sample j in group i as follows:

$$Score_{ij} = \begin{cases} \dfrac{5 \times (\delta_{ij} - \min)}{-\min}, & \delta_{ij} \leq 0 \\ \dfrac{5 \times \delta_{ij}}{\max} + 5, & \delta_{ij} > 0 \end{cases}$$

where min is the minimum value of $\delta_{ij}$ among all samples in group i, max is the maximum value of $\delta_{ij}$ among all samples in group i, and $Score_{ij}$ is the score of structural degradation for sample j in group i.

In one example, if the score is from 0 to 10, a score of 5 means that the sample or the aircraft has an average fatigue. A score less than 5 means that the sample has less than average fatigue, and a score greater than 5 means that the sample has greater than average fatigue. Accordingly, a score of 0 means that the sample has the lowest level of fatigue, and a score of 10 means that the sample has the highest level of fatigue.

As explained above, the structural group A may indicate a specific common load bearing joint area, e.g., the left leading edge extension. Thus, the score of aircraft j in structural group A can indicate the structural degradation of the left leading edge extension of aircraft j. The predictor 102 can determine scores for multiple structural groups of an aircraft. For example, the predictor can determine scores for other common load bearing joint areas such as the right leading edge extension and the forward fuselage.

The predictor 102 can sum the scores of all the multiple structural groups to determine a total score of structural degradation for an aircraft. FIG. 7(B) illustrates the total scores for the plurality of in-service aircraft. Similarly as in FIG. 7(A), each dot in FIG. 7(B) indicates an aircraft. For example, dot 702 indicates an aircraft that has 11,000 actual flight hours, and a total score of 10 indicating the overall structural degradation of the aircraft. The total score may be determined by adding the scores of the multiple common load bearing joint areas. In one example, aircraft with higher total scores are more fatigued than aircraft with lower total scores.

The predicted usage metric value and the score of structural degradation described above can be used separately or together to route an aircraft to an optimal maintenance facility.

FIG. 8 illustrates routing an aircraft to a maintenance facility based on predicted structural degradation, according to various example implementations. FIG. 8 includes a plot 800 of the prediction of structural degradation for the plurality of aircraft. In the plot, the X-axis indicates residual flight hours, and the Y-axis indicates actual flight hours. For example, circle 801 indicates an aircraft that has 18,000 actual flight hours and 7,000 residual flight hours, which means the aircraft has 25,000 predicted flight hours.

In one example, an aircraft with more than 12,000 actual flight hours will be indicated as an aircraft having high hours, and an aircraft with a positive residual will be indicated as an aircraft having high strain or fatigue. In this example, the aircraft indicated by circle 801 is an aircraft with both high hours and high strain. In another example, circle 802 indicates an aircraft with low hours and low strain.

Similarly as above, the predictor 102 can rank the plurality of in-service aircraft based on each aircraft's predicted flight hour. The ranking can indicate the levels of structural degradation to the plurality of in-service aircraft and can therefore determine the maintenance priorities to the plurality of in-service aircraft. For example, the aircraft indicated by circle 801 is ranked first among the plurality of in-service aircraft because it has the highest predicted flight hours of 25,000 hours, which indicates that it has the most fatigue and the highest maintenance priority.

In order to route the aircraft 200 to the optimal maintenance facility, in one example, the predictor 102 can also provide sub-group scores to indicate which groups or which common load bearing joint areas have experienced the most fatigue. For example, the predictor can determine that the forward fuselage of the aircraft has a high score of structural degradation and the wing has a low score of structural degradation. Based on the overall fatigue severity and the subgroups in need of repair, the instruction generator 103 can send an instruction to the aircraft or to a dispatch center to route the aircraft to the optimal maintenance facility 803, as shown in FIG. 8. The aircraft can fly to the optimal maintenance facility or be transported to the optimal maintenance facility, as instructed in the instruction. Maintenance facility 803 can perform the maintenance tasks on the aircraft routed thereto.

In one example, during a large scale induction in which every aircraft in the fleet needs to be inspected, the predictor 102 can predict the structural fatigue on each individual aircraft. This prediction can be used to rank the severity of each aircraft. The aircraft with the highest level of fatigue will be dispatched to the next available maintenance facility. This process is repeated for all aircraft until they have all been inspected and repaired. In this example, the most fatigued aircraft are fixed before they experience any further degradation.

In another example, a group of aircraft is grounded and each aircraft of the group needs to be inspected before they can fly again. The predictor 102 can rank the severity of structural fatigue on each aircraft. The aircraft with the lowest level of fatigue will be dispatched to the next available maintenance facility. The aircraft with the lowest level of fatigue will be inspected and found to be healthy in a short amount of time. This process will be repeated until all aircraft have been inspected and repaired. In this example, those aircraft with low level of fatigue will be inspected and flying again in a shorter amount of time.

In another example, some maintenance facilities or depots may have more capabilities than others, e.g., some facilities can perform heavy maintenance and others can only perform light maintenance. Some maintenance facilities may have more expertise or specialized equipment pertaining to certain aircraft sections, e.g., wings. For example, when there is an opening for an inspection at a light maintenance facility that specializes in wings, the predictor 102 can identify an aircraft that has fatigue in its wings only, i.e., other areas are predicted to be healthy. This aircraft can be routed to the light maintenance facility. A new wing kit can be delivered. Maintenance personnel specializing in wings can be also assigned to the facility. The wings of the aircraft can be fixed in a timely manner and returned to service.

In a further example, some sections or common load bearing joint areas of the aircraft may need to be inspected earlier than their scheduled interval. The predictor 102 can identify aircraft that are fatiguing faster than expected and adjust their scheduled maintenance accordingly. For example, if the vertical stabilizers are supposed to be inspected for cracks every 2,000 flight hours, the predictor can identify an aircraft that has only flown 1,000 hours but is showing a higher than expected predicted fatigue value for its vertical stabilizers. The instruction generator 103 can direct this aircraft to an appropriate maintenance facility for inspection so that it is checked sooner. In this example, the aircraft can be safely repaired before structural failure takes place.

FIG. 9 is a flowchart illustrating various operations in a method 900 of predicting structural degradation and performing maintenance induction for a plurality of in-service aircraft, according to various example implementations. As shown at block 901, the method includes identifying maintenance requirements for the plurality of in-service aircraft. At block 902, the method includes receiving fatigue metric values on historical usage and structural health condition of the plurality of in-service aircraft or common load bearing joints areas thereof. The fatigue metric values are measured by or determined from measurements from onboard sensors coupled to the common load bearing joint areas.

At block 903, the method 900 includes predicting levels of structural degradation to the plurality of in-service aircraft or the common load bearing joint areas thereof based on the fatigue metric values. At block 904, the method includes assigning maintenance priorities to the plurality of in-service aircraft based on the levels of structural degradation.

At block 905, the method 900 includes generating an instruction to route an aircraft of the plurality of in-service aircraft to a maintenance facility for maintenance based on a maintenance priority of the maintenance priorities assigned to the aircraft. The maintenance facility is capable of performing maintenance on the aircraft routed thereto consistent with the maintenance requirements for the aircraft.

According to example implementations of the present disclosure, the system 100 and its subsystems including the data collector 101, predictor 102, instruction generator 103 and display device 104 may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

FIG. 10 illustrates an apparatus 1000 according to some example implementations. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processor 1001 (e.g., processing circuitry) connected to a memory 1002 (e.g., storage device). In some examples, the apparatus 1000 implements the system 100.

The processor 1001 may be composed of one or more processors alone or in combination with one or more memories. The processor is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 1002 (of the same or another apparatus).

The processor 1001 may be a number of processors, a multi-core processor or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more ASICs, FPGAs or the like. Thus, although the processor may be capable of executing a computer program to perform one or more functions, the processor of various examples may be capable of performing one or more functions without the aid of a computer program. In either instance, the processor may be appropriately programmed to perform functions or operations according to example implementations of the present disclosure.

The memory 1002 is generally any piece of computer hardware that is capable of storing information such as, for example, data, computer programs (e.g., computer-readable program code 1003) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk—read only memory (CD-ROM), compact disk—read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 1002, the processor 1001 may also be connected to one or more interfaces for displaying, transmitting and/or receiving information. The interfaces may include a communications interface 1004 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 1006 and/or one or more user input interfaces 1005 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like. In some examples, the user interfaces include the GUI 106.

As indicated above, program code instructions may be stored in memory, and executed by processor that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 1000 may include a processor 1001 and a computer-readable storage medium or memory 1002 coupled to the processor, where the processor is configured to execute computer-readable program code 1003 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for predicting structural degradation and performing maintenance induction for a plurality of in-service aircraft, the apparatus comprising a processor and a memory storing executable instructions that, in response to execution by the processor, cause the apparatus to at least:

identify maintenance requirements for the plurality of in-service aircraft;

receive fatigue metric values on historical usage and structural health condition of the plurality of in-service aircraft, the fatigue metric values being measured by or determined from measurements from onboard sensors coupled to common load bearing joint areas of the plurality of in-service aircraft;

predict levels of structural degradation to the plurality of in-service aircraft based on the fatigue metric values for each aircraft of the plurality of in-service aircraft, including the apparatus caused to at least:

access a regression model of a relationship between the fatigue metric and a usage metric of the aircraft; and apply a fatigue metric value of the aircraft to the regression model to predict and thereby produce a predicted usage metric value of the aircraft that corresponds to the level of structural degradation to the aircraft;

assign maintenance priorities to the plurality of in-service aircraft based on the predicted levels of structural degradation; and generate an instruction to route an aircraft of the plurality of in-service aircraft to a maintenance facility for maintenance based on a maintenance priority of the maintenance priorities assigned to the aircraft, the maintenance facility being capable of performing maintenance on the aircraft routed thereto consistent with the maintenance requirements for the aircraft.

2. The apparatus of claim 1, wherein the apparatus being caused to predict the levels of structural degradation to each of the plurality of in-service aircraft includes for each aircraft of the plurality of in-service aircraft, the apparatus being caused to at least: determine a magnitude of deviation between a fatigue metric value of the aircraft and an average of the fatigue metric values of the plurality of in-service aircraft; and determine a score of structural degradation for the aircraft based on the magnitude of deviation that corresponds to the level of structural degradation to the aircraft.

3. The apparatus of claim 1, wherein the apparatus being caused to receive fatigue metric values includes being caused to receive fatigue metric values on historical usage and structural health condition of the common load bearing joint areas of the plurality of in-service aircraft, and wherein the apparatus being caused to predict the levels of structural degradation includes being caused to predict the levels of structural degradation to the common load bearing joint areas of each of the plurality of in-service aircraft.

4. The apparatus of claim 3, wherein the fatigue metric values are values of a fatigue metric, and the apparatus being caused to predict the levels of structural degradation to the common load bearing joint areas includes for each common load bearing joint area of an aircraft of the plurality of in-service aircraft, the apparatus being caused to at least:

access a regression model of a relationship between the fatigue metric and a usage metric of the common load bearing joint area; and apply a fatigue metric value of the common load bearing joint area to the regression model to predict and thereby produce a predicted usage metric value of the common load bearing joint area that corresponds to the level of structural degradation to the common load bearing joint area of the aircraft.

5. The apparatus of claim 3, wherein the apparatus being caused to predict the levels of structural degradation to the common load bearing joint areas includes for each common load bearing joint area of an aircraft of the plurality of in-service aircraft, the apparatus being caused to at least:

determine a magnitude of deviation between a fatigue metric value of the common load bearing joint area of the aircraft and an average of the fatigue metric values of the common load bearing joint area of the plurality of in-service aircraft; and determine a score of structural degradation for the common load bearing joint area of the aircraft based on the magnitude of deviation that corresponds to the level of structural degradation to the common load bearing joint area of the aircraft.

6. A method of predicting structural degradation and performing maintenance induction for a plurality of in-service aircraft, comprising:

identifying maintenance requirements for the plurality of in-service aircraft;

receiving fatigue metric values on historical usage and structural health condition of the plurality of in-service aircraft, the fatigue metric values being measured by or determined from measurements from onboard sensors coupled to common load bearing joint areas of the plurality of in-service aircraft;

predicting levels of structural degradation to the plurality of in-service aircraft based on the fatigue metric values for each aircraft of the plurality of in-service aircraft, including at least:

accessing a regression model of a relationship between the fatigue metric and a usage metric of the aircraft; and applying a fatigue metric value of the aircraft to the regression model to predict and thereby produce a predicted usage metric value of the aircraft that corresponds to the level of structural degradation to the aircraft;

assigning maintenance priorities to the plurality of in-service aircraft based on the predicted levels of structural degradation; and generating an instruction to route an aircraft of the plurality of in-service aircraft to a maintenance facility for maintenance based on a maintenance priority of the maintenance priorities assigned to the aircraft, the maintenance facility being capable of performing maintenance on the aircraft routed thereto consistent with the maintenance requirements for the aircraft.

7. The method of claim 6, wherein predicting the levels of structural degradation to each of the plurality of in-service aircraft includes for each aircraft of the plurality of in-service aircraft: determining a magnitude of deviation between a fatigue metric value of the aircraft and a n average of the fatigue metric values of the plurality of in-service aircraft; and determining a score of structural degradation for the aircraft based on the magnitude of deviation that corresponds to the level of structural degradation to the aircraft.

8. The method of claim 6, wherein receiving (902) fatigue metric values includes receiving fatigue metric values on historical usage and structural health condition of the common load bearing joint areas of the plurality of in-service aircraft, and wherein predicting the levels of structural degradation includes predicting the levels of structural degradation to the common load bearing joint areas of each of the plurality of in-service aircraft.

9. The method of claim 8, wherein the fatigue metric values are values of a fatigue metric, and predicting the levels of structural degradation to the common load bearing joint areas includes for each common load bearing joint area of an aircraft of the plurality of in-service aircraft:

accessing a regression model of a relationship between the fatigue metric and a usage metric of the common load bearing joint area; and applying a fatigue metric value of the common load bearing joint area to the regression model to predict and thereby produce a predicted usage metric value of the common load bearing joint area that corresponds to the level of structural degradation to the common load bearing joint area of the aircraft.

10. The method of claim 8, wherein predicting the levels of structural degradation to the common load bearing joint areas includes for each common load bearing joint area of an aircraft of the plurality of in-service aircraft:

determining a magnitude of deviation between a fatigue metric value of the common load bearing joint area of the aircraft and an average of the fatigue metric values of the common load bearing joint area of the plurality of in-service aircraft; and determining a score of structural degradation for the common load bearing joint area of the aircraft based on the magnitude of deviation that corresponds to the level of structural degradation to the common load bearing joint area of the aircraft.

11. A computer-readable storage medium for predicting structural degradation and performing maintenance induction for a plurality of in-service aircraft, the computer-readable storage medium being non-transitory and having computer-readable program code stored therein that in response to execution by a processor, causes an apparatus to at least:

identify maintenance requirements for the plurality of in-service aircraft;

receive fatigue metric values on historical usage and structural health condition of the plurality of in-service aircraft, the fatigue metric values being measured by or determined from measurements from onboard sensors coupled to common load bearing joint areas of the plurality of in-service aircraft;

predict levels of structural degradation to the plurality of in-service aircraft based on the fatigue metric values for each aircraft of the plurality of in-service aircraft, including the apparatus caused to at least:

access a regression model of a relationship between the fatigue metric and a usage metric of the aircraft; and apply a fatigue metric value of the aircraft to the regression model to predict and thereby produce a predicted usage metric value of the aircraft that corresponds to the level of structural degradation to the aircraft;

assign maintenance priorities to the plurality of in-service aircraft based on the predicted levels of structural degradation; and generate an instruction to route an aircraft of the plurality of in-service aircraft to a maintenance facility for maintenance based on a maintenance priority of the maintenance priorities assigned to the aircraft, the maintenance facility being capable of performing maintenance on the aircraft routed thereto consistent with the maintenance requirements for the aircraft.

12. The computer-readable storage medium of claim 11, wherein the apparatus being caused to predict the levels of structural degradation to each of the plurality of in-service aircraft includes for each aircraft of the plurality of in-service aircraft, the apparatus being caused to at least:

determine a magnitude of deviation between a fatigue metric value of the aircraft and an average of the fatigue metric values of the plurality of in-service aircraft; and determine a score of structural degradation for the aircraft based on the magnitude of deviation that corresponds to the level of structural degradation to the aircraft.

13. The computer-readable storage medium of claim 11, wherein the apparatus being caused to receive fatigue metric values includes being caused to receive fatigue metric values on historical usage and structural health condition of the common load bearing joint areas of the plurality of in-service aircraft, and wherein the apparatus being caused to predict the levels of structural degradation includes being caused to predict the levels of structural degradation to the common load bearing joint areas of each of the plurality of in-service aircraft.

14. The computer-readable storage medium of claim 13, wherein the fatigue metric values are values of a fatigue metric, and the apparatus being caused to predict the levels of structural degradation to the common load bearing joint areas includes for each common load bearing joint area of an aircraft of the plurality of in-service aircraft, the apparatus being caused to at least:

access a regression model of a relationship between the fatigue metric and a usage metric of the common load bearing joint area; and apply a fatigue metric value of the common load bearing joint area to the regression model to predict and thereby produce a predicted usage metric value of the common load bearing joint area that corresponds to the level of structural degradation to the common load bearing joint area of the aircraft.

15. The computer-readable storage medium of claim 13, wherein the apparatus being caused to predict the levels of structural degradation to the common load bearing joint areas includes for each common load bearing joint area of an aircraft of the plurality of in-service aircraft, the apparatus being caused to at least:

determine a magnitude of deviation between a fatigue metric value of the common load bearing joint area of the aircraft and an average of the fatigue metric values of the common load bearing joint area of the plurality of in-service aircraft; and determine a score of structural degradation for the common load bearing joint area of the aircraft based on the magnitude of deviation that corresponds to the level of structural degradation to the common load bearing joint area of the aircraft.

* * * * *